Patented Mar. 21, 1950

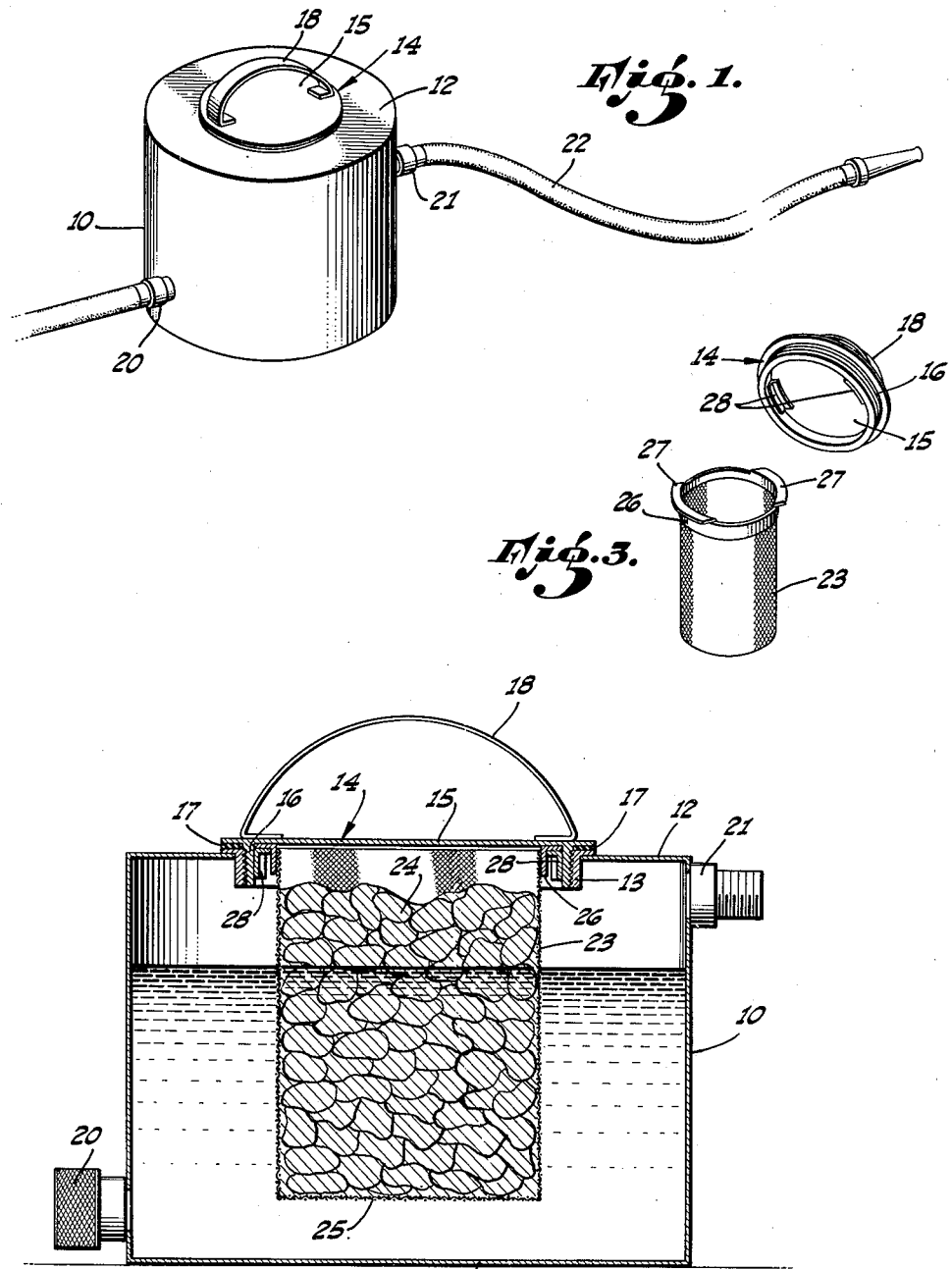

2,501,260

UNITED STATES PATENT OFFICE 2,501,260

FERTILIZER MIXER AND DISPENSER

Arvid Brodin, Los Angeles, Calif.

Application March 2, 1946, Serial No. 651,604

5 Claims. (Cl. 23—272.6)

This invention relates generally to dispensers and more particularly to dispensers of the type which are adapted to be used in the mixing and application of materials such as fertilizer for use with relatively small gardens and lawns.

It has long been recognized that it is very desirable to apply fertilizer in a liquid form so that it may be more readily absorbed and used by plants and lawns. For many years it has been customary to water plants immediately after applying fertilizer around them, thereby dissolving the soluble materials in the fertilizer and distributing them more evenly. At best, however, this has been a rather unpleasant job, and it has often been difficult to apply the fertilizer evenly and in the proper amounts. Liquid fertilizers have been developed which have simplified the proper application of the fertilizer, but this has generally been done at the cost of requiring rather expensive equipment. With the advent of synthetic or manufactured fertilizers which are completely soluble in water, it has become possible to provide the necessary fertilizing material for plants in a highly concentrated form which may be diluted to the desired concentration and then applied as a constituent of the irrigating water. If an area of any considerable size is to be fertilized, however, this has required large containers in which to mix the solution, or has required repeated mixings of smaller amounts. The simplest and most desirable method of applying such fertilizer is by including it in the irrigating water, and by making this addition to the water in such a manner that the usual irrigation practices may be continued.

It is therefore the major object of this invention to provide such a dispenser which may be connected to the usual garden hose which is then used in the conventional manner, to supply both fertilizer and irrigation water to plants and lawns.

It is a further object of the invention to provide such a dispenser which is light in weight and simple to operate so that it may be readily used by anyone.

It is still another object of the invention to provide such a dispenser which may be easily and cheaply manufactured and may be used with any desired kind of soluble, solid fertilizer.

These and other objects of the invention will become apparent from the following description of a preferred form thereof, and from the drawings illustrating that form in which:

Fig. 1 is a perspective view of the dispenser as it appears in use, with a hose connected thereto;

Fig. 2 is a cross sectional view of the dispenser, showing the relative location of the fertilizer; and Fig. 3 is a perspective view of the cap and the screen container adapted to receive and hold the fertilizer.

Referring now to the drawings, and particularly to Figs. 1 and 2 thereof, the numeral 10 indicates a housing formed of sheet metal, or other suitable material, and preferably cylindrical in shape for ease in manufacturing. The container 10 is completely closed at its lower end by a bottom 11, and is provided with an inwardly extending annular lip 12 at its upper end. An insert 13, in the form of a flanged bushing, having screw threads on its interior surface, is inserted in the opening formed by the lip 12, and is securely held to the latter as by welding. To complete the closure of the container 10, a cap 14 is provided which includes a flat circular plate 15 to which is attached a screw threaded, cylindrical portion 16 adapted to engage the threads of the insert 13. The disk 15 preferably extends beyond the cylindrical portion 16, and a gasket or washer 17 is placed between this projecting portion and the insert 13 so that a fluid-tight connection may be made. A handle 18 is securely attached to the disk 15 so that the entire container 10 may be readily lifted, and the cap 14 may be easily disengaged from the container by grasping the handle and unscrewing the cap from the insert 13. The container 10 is completed by providing a pair of fluid couplings 20 and 21 adapted to be connected to the usual garden hose so that water may flow into the container through the coupling 20, fill the container with water, and then be discharged through coupling 21 into a second section of hose 22 which may be used in irrigating lawns and plants in the customary manner. By having the couplings 20 and 21 separated vertically and horizontally, as indicated in the drawings, it is necessary for water to circulate throughout the entire container 10; and all the water within the container will thus be continuously changed.

To hold the fertilizer in intimate contact with the water within the container 10, a basket 23 is provided which is preferably formed of wire screening, perforated metal, or other foraminous material into which solid fertilizer 24 may be placed. The fertilizer 24 may be in the form of a cylinder, or may be in the form of smaller briquettes or large granules, but should be in pieces which are much larger than the holes in the basket 23. By making the basket 23 of screening, water may circulate freely through it and come into intimate contact with the fertilizer 24 contained therein, dissolving the latter and enriching the water which is then discharged through the coupling 21. The basket 23 is preferably cylindrical, and is closed at its lower end by additional screening 25 so that the fertilizer may be completely surrounded by water. In order to secure the benefits of the open mesh bottom 25, it follows that the latter should be supported above the bottom 11 of the container 10, and this is done by forming the basket 23 slightly shorter than the container 10 and supporting the basket from the cap 14.

This support may be provided in any of a number of ways, but one of the most convenient methods is to provide a sleeve 26 to which the upper, open end of the basket 23 is held by soldering or in some other convenient manner. At its upper end, the sleeve 26 is provided with a pair of outwardly extending ears 27 whose overall dimensions are such that they will fit within the cylindrical portion 16 of the cap 14. A pair of angle brackets 28 are attached to the interior surface of the cylindrical portion 16 with one of the arms of the angle abutting the cylindrical portion, and with the other arm parallel to the disk 15 but spaced a sufficient distance therefrom to receive an ear 27 and support it without binding. The circumferential dimension of the ears 27 is such that they will be held firmly against the disk 15 without any tendency to wobble, and the angles 28 are of a sufficient length to hold the ears firmly. In the form shown, two ears 27 and two angles 28 are provided, but it will be apparent that any desired number of ears and angles may be used, or that some other form of attaching means may be used, such as screw threads, or a bayonet catch. The form shown, however, is the preferred form, since it is very simple from a production standpoint, and the basket 23 need be rotated only approximately one quarter of a turn to engage or disengage the cap 14.

When the device is to be used, the cap 14 is unscrewed from the container 10 and the cap and basket 23 are removed. By removing the cap 14 from the basket 23, the latter may then be filled with any desired form of water soluble solid fertilizer, and the cap then replaced on the basket. The two are then replaced in the container 10, and the cap 14 is tightened until a fluid-tight seal is provided between it and the insert 13, the gasket 17 being compressed in this process. A hose, having one end connected to a source of water under pressure, is attached to the coupling 20; and an additional length of hose 22 is connected to the coupling 21. When the water is turned on, the container 10 will be filled to the level of the coupling 21, and water will then be discharged through the hose 22, which may then be used in the usual manner to irrigate the plants.

With the filling of the container 10, the fertilizer contained in the basket 23 has been surrounded by water and has started to dissolve, thereby enriching the water within the container. This enriched water is discharged through the coupling 21 and is applied to the lawns or plants in the manner just described. By making the container 10 relatively large as compared with the couplings 20 and 21, the rate of flow of water through the container, as measured in linear feet per minute, will be relatively slow, and there is thus less tendency for the flow of water to force small pieces of fertilizer through the openings in the basket 23 and carry them out the coupling 21 from whence they will be discharged onto the plants. Furthermore, this permits the fertilizer to be distributed more uniformly throughout the liquid in the container so that a more uniform product is discharged through the coupling 21. If a fertilizer of limited solubility is used, this limited rate of flow through the container 10 insures that a saturated solution of fertilizer is available for irrigating purposes. If the fertilizer 24 within the basket 23 extends above the level of the water within the container 10, the dissolving of the fertilizer below the water level will permit that above the water to move downwardly until it too is completely submerged, and finally, completely dissolved.

It will be seen that a simple, economical, and efficient fertilizer mixer has been provided which can be used by those unfamiliar with mechanical devices. There are no moving parts which can get out of adjustment, and by making the members of corrosion-resistant material, the device should last indefinitely.

While a preferred form of this invention has been shown, it is to be understood that modifications thereof are possible, and the device is not to be limited to the particular form or arrangement of parts herein described and shown, except as limited by the following claims.

I claim:

1. A mixing and dispensing apparatus which includes: a cylindrical housing closed at its lower end and having an inwardly projecting flange at its upper end; a fluid inlet coupling in the side of said housing near the lower end thereof; a fluid outlet coupling in the side of said housing near the top thereof, said outlet coupling being substantially opposite said inlet coupling; an annular member provided with screw threads on the inner surface thereof, mounted with a fluid-tight connection to said inwardly projecting flange; a removable cap having screw threads formed therein adapted to engage the screw threads of said annular member to form a fluid-tight seal therebetween; supporting members attached to said cap and comprising angle members having one arm thereof parallel to the lower surface of said cap and spaced therefrom; a cylindrical container having sides and bottom formed of a foraminous material; and outwardly projecting ears formed at the upper end of said container and adapted to be removably held by said supporting members, whereby said container may be removed from said cap and filled with a soluble material, and said container may be held by said cap so as to extend within said housing, whereby said material may be dissolved by a fluid passing through said housing.

2. A mixing and dispensing apparatus comprising, in combination, a housing having an opening in the top end thereof, a fluid inlet and a fluid outlet connected into said housing, a ring shaped member fixed to said top end of the housing along the margins of said opening, said ring shaped member having screw threads on the inner surface thereof, a removable cap having screw threads formed thereon adapted to engage the screw threads of said ring shaped member, a container of foraminous material adapted to be received in said housing through said ring shaped member, and means forming a quick detachable mounting for said foraminous container on the underside of said cap, entirely independent of said ring shaped member, so that said foraminous container is suspended from said cap into the interior of said housing when the cap is screwed into said ring shaped member on the housing, and is lifted from the housing as a unit assembly with the cap when the cap is unscrewed and lifted from the housing, said quick detachable mounting means permitting said foraminous container to be readily detached from said cap after the two have been removed from the housing in order to permit refilling.

3. A mixing and dispensing apparatus comprising, in combination, a housing having an opening in the top end thereof, a fluid inlet and a fluid outlet connected into said housing, a ring-shaped member on said top end of said housing along the margins of said opening, a removable cap adapted to be mounted on said housing in engagement with said ring-shaped member, interengaging locking means on said ring-shaped member and on said cap manually operable to detachably connect said cap to said top end of said housing, a container of foraminous material adapted to be received in said housing through said ring-shaped member, and quick-detachable inter-engaging mounting elements on the top end of said foraminous container and the underside of said cap, said mounting elements being entirely separate and independent of said housing, so that said foraminous container is suspended from said cap into the interior of said housing when the cap is mounted on said housing, and is lifted from the housing as a unit assembly with the cap when the cap is disconnected and lifted from the housing, said quick detachable mounting elements permitting said foraminous container to be readily detached from said cap after the two have been removed from the housing in order to permit refilling.

4. A mixing and dispensing apparatus comprising, in combination, a housing having an opening in the top end thereof, a fluid inlet and a fluid outlet connected into said housing, a ring-shaped member on said top end of said housing along the margins of said opening, a removable cap adapted to be mounted on said housing in engagement with said ring-shaped member, interengaging locking means on said member and on said cap operable by virtue of twisting of said cap to detachably connect said cap to said top end of said housing, a container of foraminous material adapted to be received in said housing through said opening, and quick detachable interengaging mounting elements on the top end of said foraminous container and the underside of said cap lockingly engageable by relative twisting movement, said mounting elements being entirely separate and independent of said housing, so that said foraminous container is suspended from said cap into the interior of said housing when the cap is mounted on said housing, and is lifted from the housing as a unit assembly with the cap when the cap is disconnected and lifted from the housing, said quick detachable mounting elements permitting said foraminous container to be readily detached from said cap after the two have been removed from the housing in order to permit refilling.

5. A mixing and dispensing apparatus which includes: a housing closed at its lower end and having an inwardly projecting flange at its upper end, a fluid inlet and a fluid outlet connected into said housing, a ring shaped member provided with internal screw threads mounted on said flange, a removable cap having screw threads formed therein adapted to engage the screw threads of said ring shaped member to form a fluid tight seal therebetween, supporting members attached to said cap and comprising angle members having one arm thereof parallel to the lower surface of said cap and spaced therefrom, a foraminous container adapted to be received in said housing through said ring shaped member, and outwardly projecting ears formed at the upper end of said container and adapted to be removably held by said supporting members, whereby said container may be removed from said cap and filled with a soluble material, and said container may be held by said cap so as to extend within said housing, whereby said material may be dissolved by a fluid passing through said housing.

ARVID BRODIN.

REFERENCES CITED

The following references are of record in the file of this patent:

UNITED STATES PATENTS

| Number | Name | Date |
|---|---|---|
| 113,844 | Brauer | Apr. 18, 1871 |
| 243,713 | Le Page | July 5, 1881 |
| 887,856 | Sieben | May 19, 1908 |
| 1,321,037 | Hedrick | Nov. 4, 1919 |